United States Patent [19]
Maraman

[11] Patent Number: 5,605,005
[45] Date of Patent: Feb. 25, 1997

[54] TACKLE BOX

[76] Inventor: Wiley F. Maraman, 32127 County Rd. 87, Robertsdale, Ala. 36567

[21] Appl. No.: 548,961

[22] Filed: Oct. 27, 1995

[51] Int. Cl.⁶ .................................................. A01K 97/06
[52] U.S. Cl. .......................................................... 43/57.1
[58] Field of Search .................................... 43/54.1, 57.1; 248/292.13, 905; 206/315.11, 493, 372, 373

[56] References Cited

U.S. PATENT DOCUMENTS

| | | |
|---|---|---|
| 1,076,898 | 10/1913 | Madsen . |
| 1,482,678 | 2/1924 | Figley . |
| 2,065,234 | 12/1936 | Martinez . |
| 2,164,259 | 6/1939 | Schweigert . |
| 2,268,920 | 1/1942 | Baumgartner . |
| 2,316,833 | 4/1943 | Baron ........................................ 43/57.1 |
| 2,364,807 | 12/1944 | Nelson, Jr. . |
| 2,447,105 | 8/1948 | Vogel ........................................ 43/57.1 |
| 2,608,459 | 8/1952 | Malnquist . |
| 2,629,963 | 3/1953 | Youker ...................................... 43/57.1 |
| 2,629,965 | 3/1953 | Chew ........................................ 43/57.1 |
| 2,665,517 | 1/1954 | Archer ...................................... 43/57.1 |
| 2,846,806 | 8/1958 | Gaines ...................................... 43/57.1 |
| 2,854,783 | 10/1958 | Armand .................................... 43/57.1 |
| 2,999,621 | 9/1961 | Kisen .................................... 206/315.11 |
| 3,022,600 | 2/1962 | Glascoff .................................... 43/57.1 |
| 3,133,374 | 5/1964 | Benson ..................................... 43/57.1 |
| 3,739,518 | 6/1973 | Ziegler ...................................... 43/57.1 |
| 4,240,222 | 12/1980 | Covington . |
| 4,958,730 | 9/1990 | Bunten . |
| 5,029,787 | 7/1991 | Florentin .................................. 248/905 |
| 5,185,952 | 2/1993 | Bruce . |

*Primary Examiner*—Kurt Rowan
*Attorney, Agent, or Firm*—David Kiewit

[57] ABSTRACT

A fishing tackle box has a plurality of compartments for storing lures. In each compartment a flexible rod, which preferably has a diameter small enough to pass through an eyelet at the front of a lure, extends into the compartment from its back wall. A kinked portion of the rod is biased against the top surface of the compartment near the door, which is opposite the back wall. When the rod is bent away from the top wall and threaded through an eyelet at one end of a fishing lure, the lure is retained between the kink and back wall. The lure is easily removed from the compartment by opening the door and pulling the lure outward.

6 Claims, 3 Drawing Sheets

TACKLE BOX

BACKGROUND OF THE INVENTION

1. Field of the Invention

The present invention relates to fishing lure storage boxes.

2. Description of Related Art

U.S. Pat. No. 5,185,952 to Bruce teaches a box with a display panel having a plurality of tracks, each track holding one or more clips, each clip comprising two resilient bifurcated legs having a hook receiving cavity between them. The hooks of adjacent lures stored in Bruce's box may become entangled unless a precisely positioned clip is provided for each hook.

In U.S. Pat. No. 4,958,730 Bunten provides an elastic retainer holding one hook of a multi-hooked lure to the top of a lure drawer. A second hook is retained by a fixed rod adjacent the bottom of the lure drawer.

In U.S. Pat. No. 4,240,222 Covington discloses a modular, multi-compartmented tackle box having various means (e.g., a transverse rod, a channel filled with a resilient foam, or a pierceable board) for suspending a lure by one hook. Covington's tackle box, if jostled, may be found to contain entangled lures.

Malmquist, in U.S. Pat. No. 2,608,459, teaches a tackle box comprising a plurality of separate lure storage compartments, each compartment lined with cork and having a bifurcated body extending across it near the top of the compartment. A lure is stored in Malmquist's box by inserting the shank of its tail hook into the bifurcating slot and suspending the lure from the tail hook, the tines of which are embedded in the cork. Fabrication of the individual compartments in Malmquist's box is time consuming and expensive.

Baumgartner, in U.S. Pat. No. 2,268,920, teaches a flexible band for mounting about the crown of a hat, the band having a plurality of safety-pin-like retainers spaced apart along its length. A fishing fly may be attached to each of Baumgartner's retainers by threading one leg of the retainer through the eyelet of the fly hook and then pushing that leg into a clamped position. Baumgartner's apparatus relies on the spacing between retainers being greater than twice the length of a lure in order to keep adjacent lures from becoming entangled. Although this may be satisfactory for relatively small dry flies, the use of Baumgartner's system for larger spinning or baitcasting lures would result either in entangled lures, or in apparatus having a severely restricted carrying capacity.

Nelson, in U.S. Pat. No. 2,364,807, teaches a lure storage box having a slotted platform. The hooks of stored lures extend downward through the slots into a separate chamber. Lures are held in position by rubber band stretched across the top of them. Nelson's apparatus involves components having complex shapes that are difficult to fabricate, and requires awkward hand motions by the fisherman who wishes to disengage a lure from the box.

In U.S. Pat. No. 2,065,234 Martinez teaches a fly box having a plurality of rigid rods extending across the surface of a resilient rubber sheet. A fly to be stored has its hook threaded carefully between a rod and the springy rubber sheet and is thereby held in a fixed position. Martinez's box is difficult to use without occasionally sticking the point of a hook into the rubber, which tears the rubber and diminishes its utility as a springy retainer.

Schweigert, in U.S. Pat. No. 2,164,259 discloses storage apparatus for fishing flies, in which the curved portion of each fly's hook is draped over a rigid rod. Adjacent flies are separated by small metal tabs, and the flies are held on the rod by a single spring. Schweigert's apparatus is not suitable for the storage of multi-hooked lures, as those hooks not draped about the rod would become entangled.

Figley, in U.S. Pat. No. 1,482,678, teaches a dry fly book in which each fly hook is retained intermediate two leaf spring elements. Figley's apparatus, like that of Schweigert and others, is not suitable for use with multi-hooked lures.

Madsen, in U.S. Pat. No. 1,076,898, teaches a storage box for skeins of yarn and the like. Madsen provides metallic spring fingers pinching the yarn against fixed projections extending inward from a wall of the box.

SUMMARY OF THE INVENTION

The invention provides a tackle box having a plurality of fishing lure storage compartments. Each compartment comprises a moveable end closure (e.g., a door) forming one end thereof. There is also a rigid supporting wall at the opposite end of the compartment and a second rigid wall (usually the top of the compartment) extending from the first rigid wall to the moveable end closure. A flexible hanger rod is cantilevered outward from the first rigid wall. A portion of the flexible hanger rod distal from the first rigid wall abuts the second rigid wall and is biased thereagainst. When the rod is bent away from the second wall and threaded through an eyelet or loop at one end of a fishing lure, the lure is thereafter retained intermediate the first wall and the point where the rod abuts the second wall.

It is an object of the invention to provide a storage box for a plurality of fishing lures, the stored lures being separated from each other so that two adjacent lures can not become entangled.

It is a further object of the invention to provide storage apparatus for a fishing lure, the apparatus suspending the lure from an eyelet or loop at the front end thereof, the apparatus retaining the lure through periods of mechanical vibration and shock, the apparatus releasing the lure when a user grasps the lure and pulls it in a single predetermined direction.

DESCRIPTION OF THE PREFERRED EMBODIMENT

Figure 1:
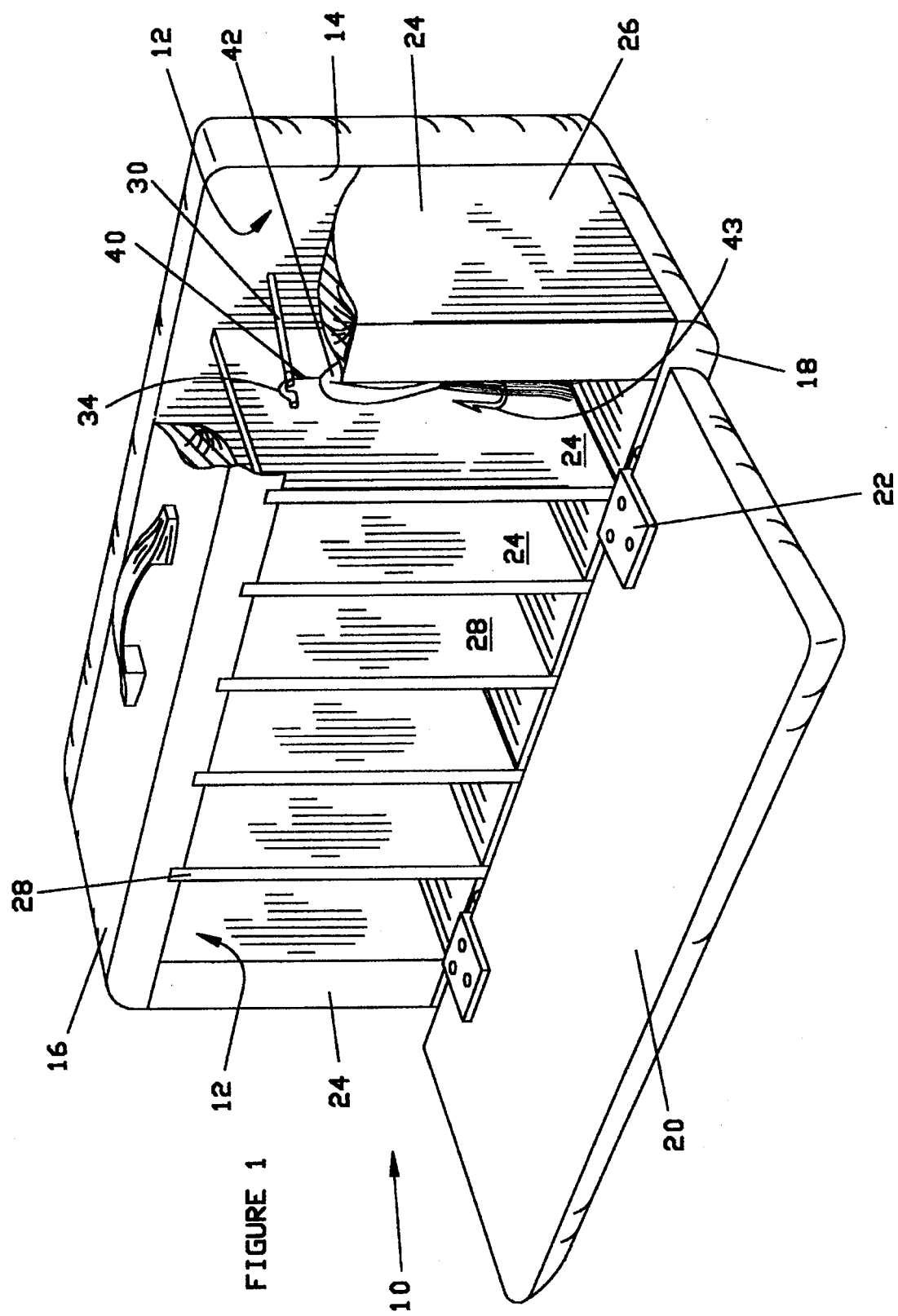
FIG. 1 of the drawing is a partly cut-away elevational view of a tackle box of the invention.
Figure 2:
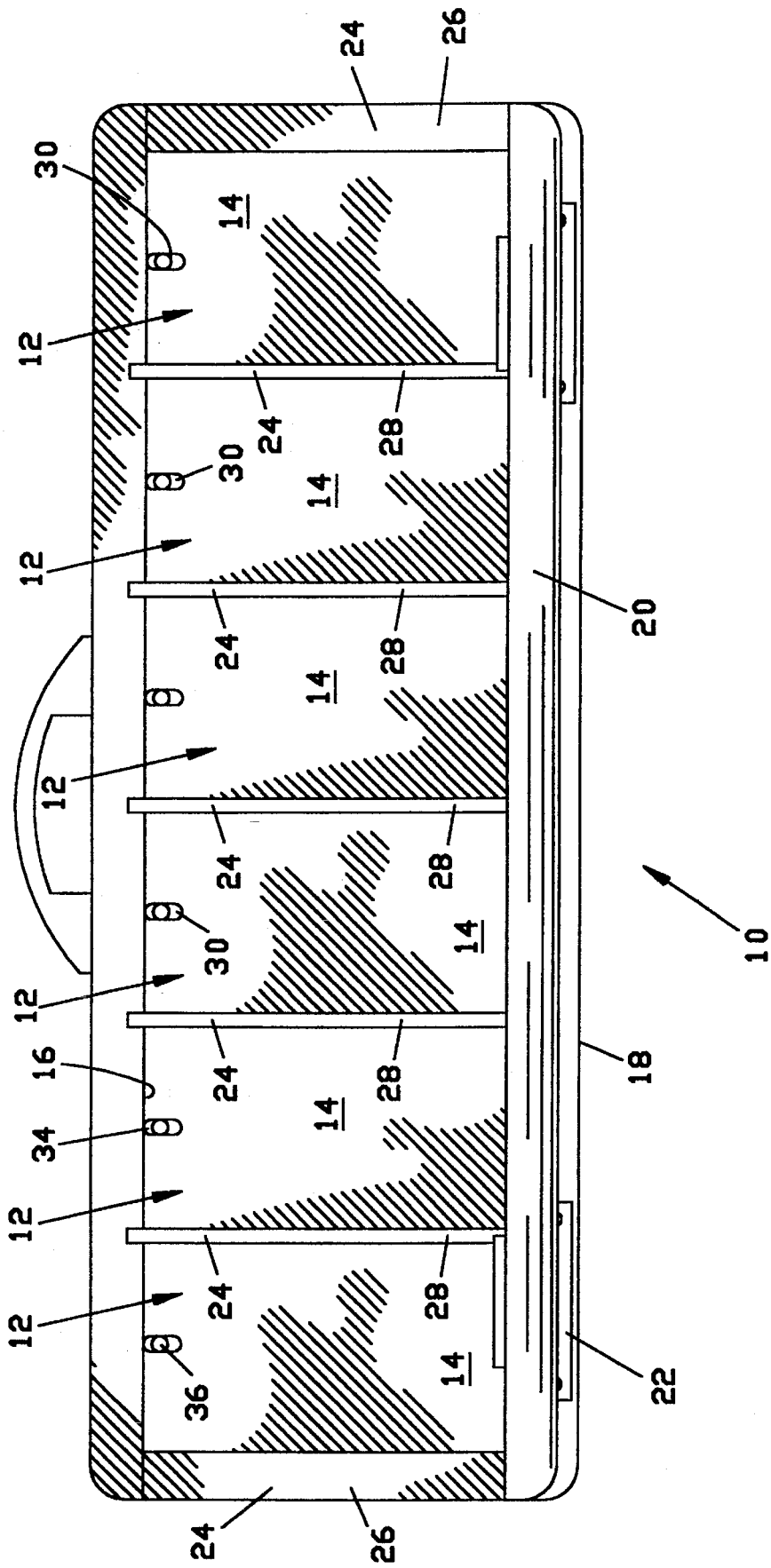
FIG. 2 of the drawing is a front elevational view of the tackle box of FIG. 1.

FIG. 1 of the drawing shows a partially cut-away view of a preferred fishing tackle box 10 comprising a plurality of compartments 12 sharing rigid back 14, top 16, and bottom 18 walls. A single door 20, connected by hinges 22 to the bottom 18, serves as a moveable closure for all the compartments 12. Each compartment 12 also has two side walls 24, at least one of which is an interior wall 28, and one of which may be an outside end wall 26 of the box 10.

An important feature of the invention is a flexible, springy hanger rod 30 projecting inward to the compartment 12 from the end wall 14 and abutting another wall (preferably the top wall 16) at a point distal from the back wall 14. In a preferred embodiment the hanger rod 30 comprises a springy rod (e.g., a piece of 0.0625 inch diameter piano wire) mounted in an upward slanting hole 32 in the back wall 14 (e.g., a hole 32 drilled at an angle of about 10° to a line drawn perpendicular to the back wall 14). The flexible hanger rod 30 preferably has a kink 34 near, but slightly displaced from, the free end 36 of the hanger rod 30 that is distal from the back wall 14, the kink 34 being biased against the top wall 16 by the elastically deformed flexible rod 30. In a preferred embodiment the kink 34 has a semi-circular profile with a radius of 0.125 inch, the center of the semi-circle located 0.250 inch from the distal end 36 of the piano wire hanger rod 30. The axis of the distal end portion 38 of the flexible hanger rod 30 is preferably nearly normal to the back wall 14, and does not abut the top wall When the door 20 of the tackle box 10 is open, the preferred hanger rod 30 (which has a diameter less than the internal diameter of an eyelet 40 of a fishing lure 42) may be threaded through the eyelet and the fishing lure 42 thereafter pushed along the rod 30 and past the kink 34 toward the back wall 14. Because the kink 34 is biased against the top 16 of the compartment 12, and the intermediate portion 44 of the flexible hanger rod 30 is held out of contact with the top 16 of the compartment 16 by the kink 34, the stored lure 42 can slide relatively freely along the rod 30 between the wall 14 and the kink 34. Although lures 42 conventionally have eyelets 40 at their front ends, it may be noted that a user who preferred to store lures tail-end uppermost could achieve substantially the same storage arrangement by pushing a hook 43 of the lure 42 over the flexible hanger rod 30. Because of this choice, the rod 30 is not necessarily constrained to have a diameter less than that of the smallest eyelet 40 that a lure manufacturer chooses to use.

More than one lure 42 may be stored on a single hanger 30. Although there is some risk of the hooks of adjacent lures 42 on a single rod 30 becoming entangled, this risk is minimized by using compartments with a relatively narrow width (i.e., the distance between the side walls 24), which reduces the degree to which the lures 42 can swing from side to side. On the other hand, if the compartment is made too narrow, the user will have trouble inserting his or her finger into the compartment to retrieve a lure.

Figure 3:
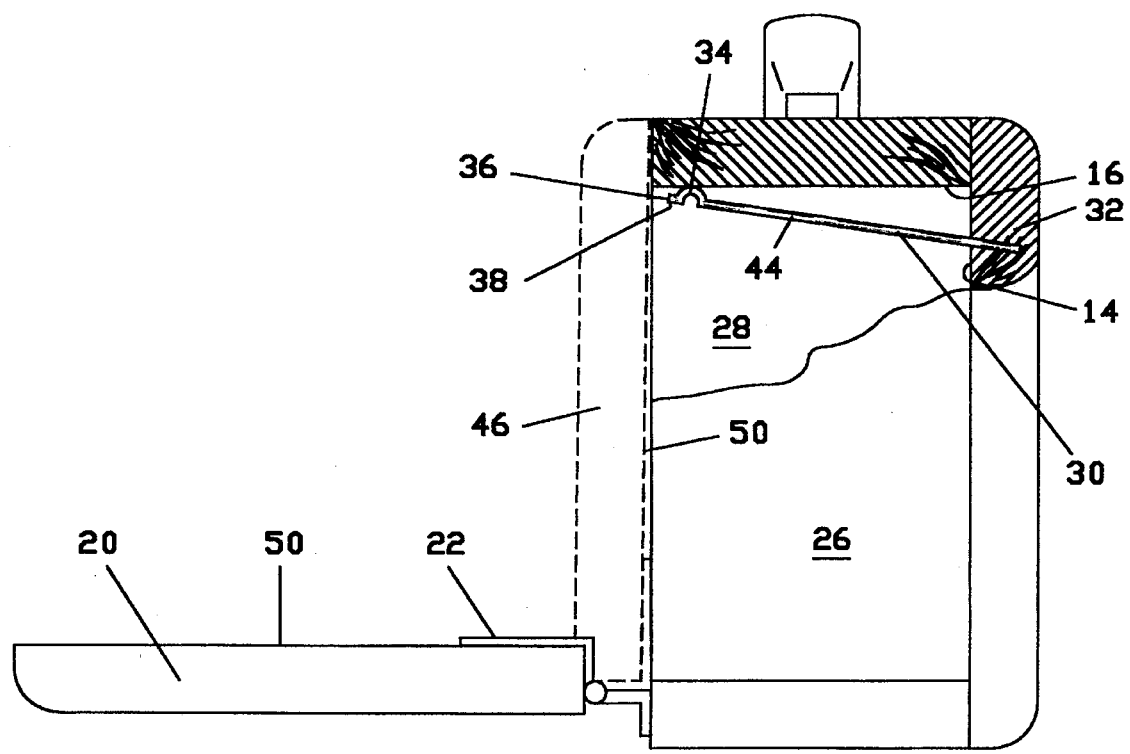
FIG. 3 of the drawing is a partly cut-away side elevational view of the tackle box.

A tackle box 10 may be subject to being dropped or otherwise jarred in transport, during which time the door 20 is expected to be in the closed position (as shown in phantom and designated with reference numeral 46 in FIG. 3 of the drawing). It will be understood that a shock force acting generally along the axis of the rod 30 in a direction away from the fixed wall 14 could cause a stored lure 42 to ride up over the kink 34 and fall off the distal end 36 of the rod 30. In order to prevent this, a preferred embodiment of the invention provides a close spacing between the distal end 36 of the flexible hanger rod 30 and the moveable closure 20 in its closed position 46. If the portion of the kink 34 that is proximal the supporting wall 14 is less than half the width of the lure 42 (e.g., about 0.25 inch) from the inward facing surface 50 of the moveable closure, the lure 42 will bump against the door 20 before the eyelet 40 can ride up over the kink 34. In a specific preferred embodiment, the distal end 36 of the piano wire rod 30 is spaced about 0.0625 inch from the closed door 20, and the proximal end 48 of the kink 34 is within 0.25 inch of the door 20.

It will be understood to those skilled in the art that although it is preferred that the kink 34 abut the top 16 of the box 10, one could equally well construct a lure storage compartment 12 having a flexible hanger rod 30 abutting a side wall 24. Moreover, although the preferred flexible hanger rod 30 comprises a kink 34 abutting a flat wall 16, 22 of a compartment, and having a distal end 30 spaced apart by a small predetermined amount from an inward facing surface 50 of a moveable closure 20, one could build an equivalent storage compartment 12 in which an unkinked flexible rod (not shown) was elastically biased into a slot (not shown) in one of the walls 16, 22 or comprised a distal end 30 extending into a receiving cavity (not shown) disposed on the inward facing surface 50 of a door 20.

It will be further understood that although the preferred embodiment comprises a piano wire rod 30 mounted in a hole 32 slantingly disposed in the back wall 14 of a compartment 12, a variety of other equivalent means exist for providing a flexible hanger rod 30 cantilevered from a fixed wall 14 of a compartment 12 and biased by elastic forces into a second fixed wall 16, 22 of the compartment.

It will also be understood that although the preferred embodiment 10 provides a single door 20 closing a plurality of compartments 12 separated by interior walls 28 extending from a common top 16 to a common bottom 18, many other choices may be made in the design of the compartment. The interior walls' 28 function of separating lures 42 in adjacent compartments 12 could be served, for example, by separators extending less than all the way from the top 16 to the bottom 18 of a compartment 12. Moreover, it is recognized that an arbitrary number of compartments 12 equal to or greater than one can be used for a tackle box 10.

Although the present invention has been described with respect to a preferred embodiment, many modifications and alterations in addition to those described supra can be made without departing from the invention. Accordingly, it is intended that all such modifications and alterations be considered as within the spirit and scope of the invention as defined in the attached claims.

What is desired to be secured by Letters Patent is:

I claim:

1. In a fishing lure storage compartment comprising a rigid end wall, a moveable closure opposite the rigid end wall and a second rigid wall extending from the end wall to the closure, an improvement comprising a flexible hanger rod extending inward from the rigid end wall to a free end distal from the rigid end wall, a portion of the hanger rod adjacent the free end thereof biased into contact with the second rigid wall.

2. The storage compartment of claim 1 wherein the moveable closure comprises a door, the first rigid wall comprises a back wall of the compartment and the second rigid wall comprises a top of the compartment.

3. The storage compartment of claim 1 wherein the hanger rod comprises a kinked portion adjacent the free end thereof and an end portion extending from the kinked portion to the free end thereof, wherein the kinked portion abuts the second rigid wall and wherein the end portion does not abut the second rigid wall.

4. The storage compartment of claim 3 wherein the moveable closure comprises a door having an inward facing surface spaced apart from the kinked portion of the hanger rod by less than a width of a fishing lure.

5. The storage compartment of claim 1 wherein the hanger rod has a diameter less than the internal diameter of an eyelet disposed at the front end of a fishing lure.

6. A fishing tackle box comprising a plurality of the compartments of claim 1, each of the compartments separated from an adjacent compartment by a wall.

* * * * *